(12) United States Patent
Fan et al.

(10) Patent No.: US 8,237,964 B2
(45) Date of Patent: Aug. 7, 2012

(54) PRINT JOB SCHEDULING FOR PROCESSING PRINT JOBS BASED ON USER SET DELAY CRITERIA

(75) Inventors: Zhigang Fan, Webster, NY (US); R. Victor Klassen, Webster, NY (US); David Mantell, Rochester, NY (US); Warren Kleiman, Fairport, NY (US); Gregory W. Zack, Pittsford, NY (US); Christopher Jon Regruit, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 694 days.

(21) Appl. No.: 12/366,057

(22) Filed: Feb. 5, 2009

(65) Prior Publication Data

US 2010/0195141 A1    Aug. 5, 2010

(51) Int. Cl.
*G06F 3/12* (2006.01)
*G06K 15/00* (2006.01)

(52) U.S. Cl. .................. 358/1.15; 358/1.13; 358/1.14; 358/1.16; 358/1.18

(58) Field of Classification Search ............... None
See application file for complete search history.

(56) References Cited

U.S. PATENT DOCUMENTS

| | | | |
|---|---|---|---|
| 5,095,369 A | 3/1992 | Ortiz | |
| 5,696,893 A | 12/1997 | Fromherz | |
| 5,701,557 A | 12/1997 | Webster | |
| 6,856,411 B1 | 2/2005 | Purvis | |
| 7,125,179 B1 * | 10/2006 | Rai et al. ................... | 400/62 |
| 2006/0028680 A1 * | 2/2006 | Uchiyama et al. ........ | 358/1.15 |
| 2006/0268317 A1 | 11/2006 | Lofthus et al. | |
| 2007/0091344 A1 * | 4/2007 | Taneda et al. ............ | 358/1.13 |
| 2007/0103523 A1 | 5/2007 | Snyder et al. | |
| 2007/0296778 A1 | 12/2007 | Snyder et al. | |
| 2008/0158574 A1 * | 7/2008 | Sugiyama .................. | 358/1.1 |
| 2008/0180737 A1 * | 7/2008 | Sakamoto ................. | 358/1.15 |

OTHER PUBLICATIONS

U.S. Appl. No. 10/924,458, filed Aug. 23, 2004, Lofthus et al.
U.S. Appl. No. 11/137,634, filed May 25, 2005, Lofthus et al.

* cited by examiner

*Primary Examiner* — Benny Q Tieu
*Assistant Examiner* — Haris Sabah
(74) *Attorney, Agent, or Firm* — Fay Sharpe LLP

(57) ABSTRACT

A printing system capable of concurrently processing and scheduling a plurality of job streams and including at least one marking engine and multiple print media destination is controlled by a controller that includes a jobs scheduler for determining a schedule for processing queued print jobs using the plurality of concurrent job streams. The job scheduler determines the schedule using a method including: determining a utility function dependent at least upon user preference delay criteria, and the schedule of the queued print jobs; and optimizing the utility function respective to the schedule of queued print jobs.

15 Claims, 1 Drawing Sheet

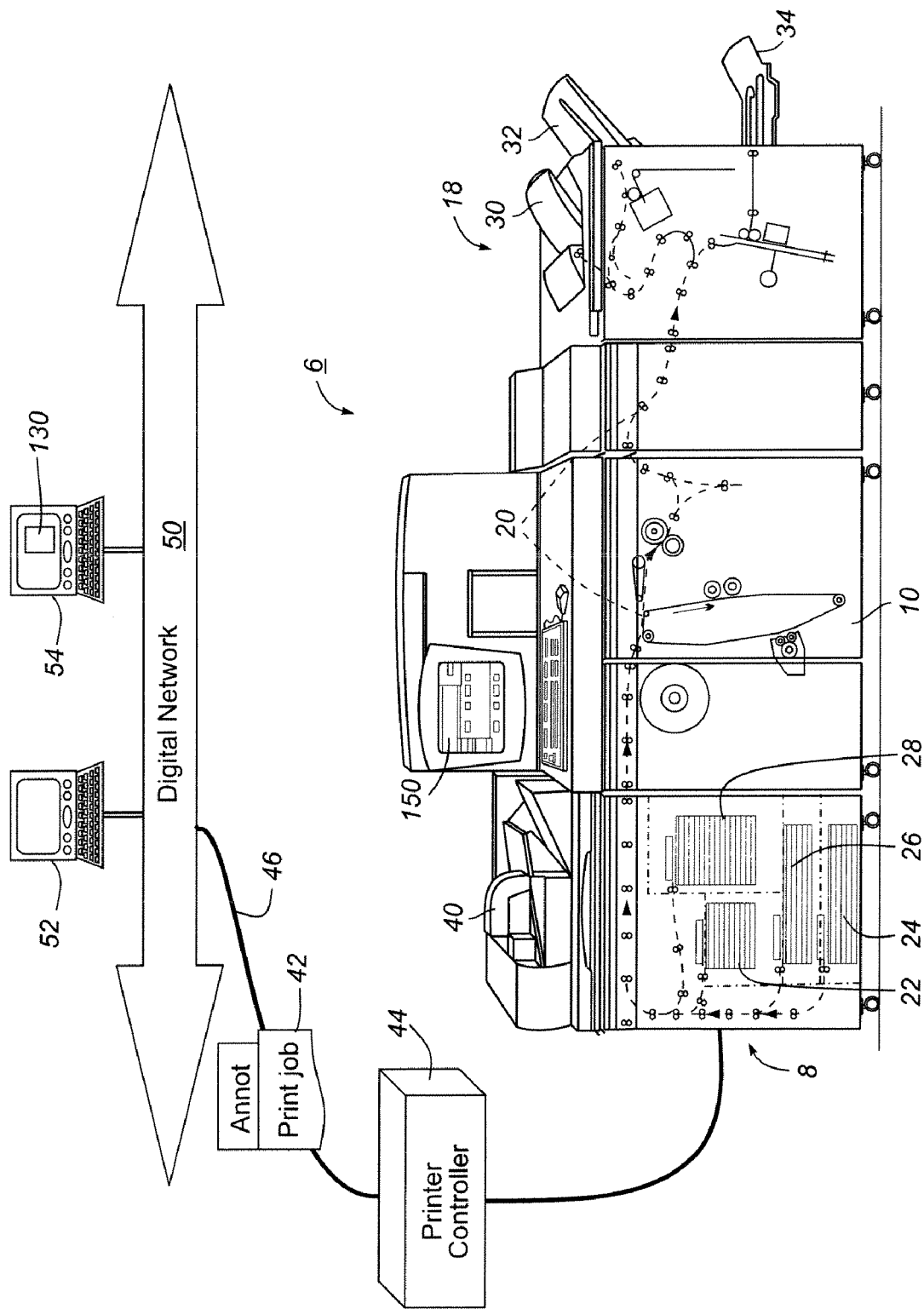

PRINT JOB SCHEDULING FOR PROCESSING PRINT JOBS BASED ON USER SET DELAY CRITERIA

BACKGROUND

The exemplary embodiments relate to the printing and marking arts. They particularly relate to printing systems with a processing unit providing substantial degrees of freedom in performing print jobs, and to print job scheduling for such printing systems. The following disclosure relates to printing and marking systems of all types, and to print job scheduling for same.

Printing systems have generally been designed with a strong emphasis on ease of use, and a lesser emphasis on exploiting to the fullest the capabilities of the underlying printing hardware. Accordingly, the user is typically given a few pre-selected controls each having a limited number of pre-selected settings. For example, an image contrast control may have a "photo-optimized" setting, a "graphics-optimized" setting, and a "text-optimized" setting.

Additionally, printing systems have generally employed only one or a few sheet paths, and only one or a few print job destinations. For example, a typical printing system may have a single marking engine, which bottlenecks sheet processing down to a single print path. The print media conveyor may be configured to limit sheet processing to a single print path. In such an arrangement, the print jobs are queued and performed sequentially, in a first in-first out (FIFO) sequence.

Most printing hardware uses a different amount of energy depending on whether it is preparing to print a page, printing a page, or waiting for a job to print. When it is idle, (i.e. waiting for a job to print), it uses the lowest amount of power, requiring only a small amount to listen on the network port. Before printing, it may need to warm up, causing it to draw substantially more power than when it is idle, possibly more power than when it is actually printing. Because no pages are actually being printed during the warm up time, more energy is used if a series of small jobs are printed at intervals than if they are printed immediately after each other.

FIFO print job queue/processing does not fully leverage the capabilities of intelligent jobs scheduling and can increase machine (image marking engine) powering up/powering down cycles and thereby increase power consumption and machine maintenance.

REFERENCES

The following references, the disclosures of which are incorporated by reference relate generally to scheduling in a printing system:

U.S. Pat. No. 5,095,369 to Ortiz, et al. discloses a method for enhancing productivity in an electronic printer incorporating finishing activities and operating in a job streaming mode. Printing and collating of sets of original scanned documents are controlled so that collated sets are successively presented by the printer to the finisher nearly coincident with conclusion of the finishing activity being accomplished for a current job. The system uses a predictive algorithm which is used to increase reliability of printer components by cycling down the printer between jobs in situations where the finishing activity for a current job requires an extraordinarily long time to complete compared with the cycle down/cycle up time of the printer.

U.S. Pat. No. 5,701,557 to Webster, et al. describes an image processing apparatus with a controller and plural modules and a method to define a configuration of the image processing machine.

U.S. Pat. No. 6,856,411 to Purvis, et al. discloses a scheduler for picking an itinerary in a printing machine to schedule the processing of sheets through several modules of the printing machine. The scheduler uses hard "must have" policies and soft "desired" policies to select an itinerary.

U.S. Pat. No. 5,696,893 to Fromherz, et al. describes a method for modeling a printing machine specifying a structure model with its physical and software interface and internal resource requirements, and a behavior model to describe capabilities of a component with its description of work units, transformation of work units, timed events, resource allocations, constraints and restrictions.

U.S. application Ser. No. 10/924,458 filed Aug. 23, 2004 entitled PRINT SEQUENCE SCHEDULING FOR RELIABILITY, by Robert M. Lofthus, et al. (A3548-US-NP) discloses a scheduler for a printing system including a plurality of printers which schedules a sequence for printing a plurality of print jobs by the printers based on minimizing printer downtime or maximizing continuous printer run time.

U.S. application Ser. No. 11/137,634 filed May 25, 2005 entitled PRINTING SYSTEMS, by Robert M. Lofthus, et al. discloses a printing system capable of concurrently processing a plurality of job streams and including one or more marking engines and multiple print media destinations is controlled by a controller for processing queued print jobs.

BRIEF DESCRIPTION

Aspects of the present disclosure in embodiments thereof include a printing system comprising at least one marking engine and a user interface for inputting user determinable delay criteria for a print job. The printing system further comprises a communication link for passing the respective user determinable delay criteria for each print job to a job scheduler. The job scheduler determines a print schedule for processing the print job and wherein the job scheduler determines the print schedule dependent upon the user determinable delay criteria, a job arrival time, and a system model of capabilities of the at least one marking engine.

In another aspect of the present disclosure, a printing system is provided comprising at least one marking engine and a user interface for inputting user determinable delay criteria for a print job wherein the user determinable delay criteria is selected from the group consisting of actual time plus delay time and latest required print time for printing each job. The printing system further comprises a communication link for passing the respective user determinable delay criteria for each print job to a job scheduler. The job scheduler determines a print schedule for processing the print job and wherein the job scheduler determines the print schedule dependent upon the user determinable delay criteria including required print time of printing for each job, latest starting printing time for each job, and latest finish printing time for each job.

In still another aspect of the present disclosure, a printing system is provided comprising at least one marking engine and a user interface for inputting user determinable delay criteria for each print job in a plurality of print jobs. The printing system further comprises a communication link for passing the respective user determinable delay criteria for each print job to a job scheduler. The job scheduler determines a print schedule for processing sequentially each print job and wherein the job scheduler determines the print schedule dependent at least upon the user determinable delay criteria and a system model of capabilities of the at least one marking engine, and wherein each new print job is scheduled in a sequential print order.

A printing method may include maintaining a system model of a printing system that includes inputting via a user interface user determinable delay criteria for each print job in a plurality of print jobs and receiving the plurality of print jobs from a print controller and the respective user determinable delay criteria for each print job. The method further includes scheduling received print jobs for processing by optimizing a utility function that is dependent upon the user determinable delay criteria, the jobs schedule, and a system model. The processing of the print jobs into a sequential print schedule can include the user determinable delay criteria of each print job comprising a first print job arrival time plus a first print job user determinable delay time, or a first print job determinable required print time. The printing method further includes searching backward from the end of a print queue and stopping at a place (Q) if at least one of the following two conditions is met: the determined delay time of the at least second print job can be met if it is printed after the (Q) job is printed; or, if the at least second print job is printed before the (Q) job, it will cause the (Q) job to miss its associated determined delay time.

BRIEF DESCRIPTION OF THE DRAWINGS

FIG. 1 diagrammatically illustrates an exemplary printing system.

DETAILED DESCRIPTION

With reference to FIG. 1, an example printing system 6 can be a printing system including processing units 8. While one processing units are illustrated, the number of processing units may include one, two, three or more processing units.

The description to follow will describe a job scheduling system and method in association with a single marking engine. The print media source processing unit 10 includes print media sources 22, 24, 26, 28 connected with the print media conveyor 20 to provide selected types of print media. While four print media sources are illustrated, the number of print media sources can be one, two, three, four, five, or more.

The print media conveyor 20 is controllable to acquire sheets of a selected print medium from the print media sources 22, 24, 26, 28, transfer each acquired sheet to marking engine processing unit 10, to perform selected marking tasks, transfer each sheet to the finisher 18 to perform finishing tasks. The finisher unit 18 includes multiple print media destinations 30, 32, 34; while three destinations are illustrated, the printing system 6 may include more or less print media destinations.

Print jobs can be supplied to the printing system 6 in various ways. A built-in optical scanner 40 can be used to scan a document such as book pages, a stack of printed pages, or so forth, to create a digital image of the scanned document that is reproduced by printing operations performed by the printing system 6. Alternatively, a print job 42 can be electronically delivered to a printing controller 44 of the printing system 6 via a wired connection 46 to a digital network 50 that interconnects example computers 52, 54 or other digital devices. For example, a network user operating word processing software running on the computer 54 may select to print the word processing document on the printing system 6, thus generating the print job 42, or an external scanner (not shown) connected to the network 50 may provide the print job in electronic form. While a wired network connection or communication link 46 is illustrated, a wireless network connection or other wireless communication pathway may be used instead or additionally to connect the printing system 6 with the digital network 50. The digital network 50 can be a local area network such as a wired Ethernet, a wireless local area network (WLAN), the Internet, some combination thereof, or so forth. Moreover, it is contemplated to deliver print jobs to the printing system 6 in other ways, such as by using an optical disk reader (not illustrated) built into the printing system 6, or using a dedicated computer connected only to the printing system 6.

With respect to one exemplary image marking engine and with continuing reference to FIG. 1, the printing controller 44 can initially create a job queue that receives print jobs in the order they are sent to the printing system 6. The number of jobs in the job queue can vary depending upon the load. At any given time, there may be zero, one, two, or more print jobs queued in the jobs queue. A job scheduler can schedule the print jobs in a queue based on user acceptable delays or user determinable delay criteria. In order to assess properties of print jobs, a low resolution decomposition engine or coarse raster image processing (RIP) or other previewer can be suitably employed. The coarse RIP can be used, for example, to determine an estimated time to prepare each sheet of the job at full resolution.

In many instances, the allocation of print jobs may be scheduled in a way that is different from the order in which the print jobs were added to the job queue. However, in some specific instances the scheduling, using predetermined acceptable delays based on user selected parameters, may coincidentally schedule print jobs in a FIFO ordering.

Scheduling jobs intelligently (i.e. sequentially or back-to-back job clustering) may reduce machine powering up and powering down cycles and thereby save power consumption and machine maintenance. However, any such kind of scheduling is inevitably associated with a certain degree of customer output delay. In the present disclosure, a method, to be described hereinafter, can optimize the job scheduling without compromising customer output requirements. The proposed method includes: a user interface (UI) 150 that permits users to specify an "acceptable delay criteria" or other user selected constraints 130 for a job and a job scheduling means or algorithm that optimizes the resource consumption (warm-up power, banner sheets) given the constraints to satisfy customers' acceptable delay for each print job.

The delay criteria 130 (for deciding whether to print the current job or hold it for later printing with other jobs) can include one or more of: 1) a fixed delay time (e.g., print every 30 minutes); 2) clock time (e.g., print at 10 am, 2 pm); 3) number of the user's jobs being held; 4) job size (threshold page count); 5) cumulative page count; 6) job type (e.g. with or without images, with or without color); and, 7) the submitting application (e.g., Word, PPT, Outlook). When printed, the user's jobs can be clustered, optionally under a single banner sheet.

Customers or users typically have different urgency for different print jobs. Some print jobs may need immediate attention, while other print jobs can be delayed for a few minutes, a few hours, or even to be printed overnight at off peak energy usage hours. Some print jobs may be needed at a specific time in the future. Providing the user with a mechanism to specify their job urgency permits scheduling jobs consistent with the user requirements and acceptable delays. In the present ID, the UI for tagging "acceptable delay time" can be an independent UI, or alternatively, a part of the printer driver UI. Users can specify "acceptable delay time", or "required print time" (via user selected constraints 130) when a job is submitted, or a default "acceptable delay time" can be used.

The proposed job scheduling method attempts to delay or hold the received printing jobs as long as possible (but not exceeding the "acceptable delay" specified by the user if it is possible), in the hope of "job clustering" or job sequencing of one print job immediately after another preceding print job. Namely, more jobs may come during this hold period of time and they can be placed in a queue and printed sequentially. In case "acceptable delay" cannot be satisfied, the jobs can be prioritized in the order of first in first out (of those jobs that cannot be printed within their timeline). This can happen in the following exemplary scenario: a first job, which requires 10 minutes of printing time is received at 1:00 pm and includes an acceptable delay time of 20 minutes. It is scheduled to begin printing at 1:10 pm. A second job, which is 20 minutes long comes at 1:15 pm and needs immediate attention (acceptable delay=0). In this example, the first job will be printed first at 1:10 pm (before the second job arrives), and the second job will be printed at 1:25 pm after the completion of the first job with a 10 minute delay.

A more complex exemplary scenario can be described as follows: a first job, requiring 10 minutes, arrives at 1:00, with a 2:00 deadline (i.e. required print completion time), a second job, requiring 5 minutes arrives at 1:15, with a 1:30 deadline, and a third job, requiring 10 minutes arrives at 1:22, with a 1:32 deadline (i.e. requests immediate printing). In this exemplary scenario, the second job would immediately begin printing at 1:22, and at 1:27, the third job would begin, finishing at 1:37 (five minutes late); and then, the first job would immediately begin printing, since the printer is already running.

Additionally, a buffer time can be added into the calculation of start time. The buffer time can be used to cause the first job to start printing earlier than absolutely necessary. This additional time ensures that schedules can be met more reliably at the risk that some jobs may be started and finished before the maximum number of other jobs are included within the sequence of contiguous jobs. In the above example, if a five minute buffer time was used, job two would start at 1:20 and finish at 1:25. Initially job one would be scheduled to follow. But, when job three arrives, because it is required immediately it would be inserted between the other jobs. Thus, job three would start at 1:25 and finish at 1:35, followed by the first job. If the buffer was 10 minutes, then the following job sequence would occur: job two starts at 1:15 and ends at 1:20, job one starts at 1:20 and ends at 1:30, and then job three starts at 1:30 and ends at 1:40. The buffer time can be adjusted to balance the need to print jobs in a timely manner and to ensure jobs are printed sequentially. The buffer time can be adjusted for various conditions. For example the buffer time can be increased to account for times of typically higher usages or when there are more pages already in the queue.

As discussed above, when each job arrives, a pre-scan process can be performed, which provides the dual functions of 1) converting the incoming data stream into a "print-ready" form, and 2) counting the job's pages. The print-ready form may be any of a number of forms which are sufficiently predictable in their nature that it would be safe to start printing, knowing that the printer would never need to stop while the processor prepares the next page. Counting pages provides the system with the information needed to know how long each job will take to print. Once the print-ready form has been created, the original input may be deleted from the input spool disk, if it is stored there, since the print-ready form contains the necessary data for processing the print job.

In the proposed method, a plurality of print jobs can be managed with three 1-D arrays as follows; J[.], P[.], and L[.]. J[.] and L[.] can each have N elements and P[.] can have N+1 elements, where N is the number of jobs that are waiting to be printed. J[.] is the print queue and J[i] is the job ID of the i-th job to be printed. P[i], L[i] are J[i]'s planned printing time and the latest printing time requested by users, respectively. All arrays are empty initially, and for each new arriving job, the following algorithm can be used to insert the job into the queue, and adjust the print starting time:

1. For a new job arriving at time T, the latest time the job needs to be printed is L=T+D, where D is the "user acceptable delay" specified in the job ticket by the user, or L="required print time" (i.e. deadline) as specified on the job ticket by the user.
2. If N=0, where N is the number of the jobs existing in the queue before the new job arriving, insert the job into the queue by setting N=1, J[1]=new job ID, L[1]=L, P[1]=L, and P[2]=P[1]+$\Delta$T, where $\Delta$T is the time required to print the new arriving job and then go to step 13; otherwise go to step 3.
3. Let W=P[1]−T, and MIN_W=W.
4. For i=N to 1 do steps 5-8.
5. If L>P[i+1]−W+MIN_W, then Q=i and go to step 9.
6. If P[i]−W+$\Delta$T>L[i], then Q=i, MIN_W=0, and go to step 9.
7. Otherwise MIN_W=Min(L[i]−P[i]−$\Delta$T, MIN_W).
8. i=i−1
9. Insert the new job after Q-th job (if Q=0 the new job is inserted before the $1^{st}$ job) by letting $J[Q+1]$=new job ID, and $L[Q+1]$=$L$, and $J[i+1]$=$J[i]$ and $L[i+1]$=$L[i]$, for $i$=$Q$+2, $Q$+3, ..., $N$.

10. If the disk that stores jobs gets at risk of being full, set MIN_W=0,
11. Adjust the planned printing time for each job by letting:

$P[i]$=$P[i]$−$W$+MIN_$W$, for $i$=1, 2, ... $Q$+1, and $P[i]$=$P[i]$−$W$+MIN_$W$+$\Delta T$, for $i$=$Q$+2, $Q$+3, $N$+2;

12. Set N=N+1.
13. Start printing all the jobs in the queue at time P[1], in the order of J[1], J[2], J[N].
14. The arrays and variable N are updated when each job is printed.

The algorithm, detailed above, attempts to find an appropriate place to insert each new arriving job in the print queue. It searches backwards from the end of the queue (i.e. the print job scheduled last in the print queue). The searching stops at place Q if at least one of the two conditions is satisfied: 1) The "acceptable delay time" of the new job can be met if it is printed after Q-th job (step 5); and/or 2) if the new job is printed before the Q-th job, it will cause the Q-th job to miss its "acceptable delay time" (in step 6).

W, the current waiting time (before the new job arriving) is calculated as the difference between the planned start-printing time and "now" (step 3), while MIN_W (minimum wait time) tracks the updated waiting time required to insert the new job at different places.

There are many possible variations. One is to start printing at P[1]−delta, (instead of P[1] as described above), where delta is a non-negative number. Earlier printing may prevent later congestion. This may be particularly useful for a relatively busy printer, or a printer which is expected to be busy at certain periods of time. A larger delta reduces possible user delay at the cost of decreased clustering. The delta can be optimized by statistical data analysis and/or user behavior studies. For example, many users may want to pick up their printouts before they leave office, and specify their "acceptable delay" or "required print time" accordingly. A larger delta can be applied before the top of the hour or at the hour the office closes, and a smaller one during other times. Another variation could include clustering of like jobs, such as duplex/simplex, image quality modes, or by user, if machine settings differ and this has any benefit in print time or energy use.

There are some other aspects to consider regarding a print queue that operates in the manner described above. For effective operation, customers need to believe that their prints will be done when they require. If users begin to doubt they will tend to reduce their acceptable delay or ask for immediate output if they feel that prints may not be ready in time. The main cause would be machine interruptions, so it would be imperative to find all ways to reduce these. For example a machine might need to give alerts to pending paper out conditions rather than actually waiting for the paper to actually be out. Multi-function machines can give priority to a customer that walks up to the machine for a copy job. The utility function 84 can alternatively queue these jobs if it is in the middle of a time critical queue.

Even more critical may be how faults such as jams are handled. Even though a jam delays jobs regardless of their given acceptable delay it is human nature to distrust the acceptable delay feature when a print job does not come out in time. Thus a mechanism is needed to ensure users do not perceive a user "acceptable delay" puts them at a disadvantage. Thus, if a jam or other fault delays printing it would be advantageous to reorder the queue so that jobs that are submitted first will be advanced to ensure that they are printed as close to their required time as possible. Furthermore, a mechanism that alerts all users in a queue and 'pushes' the alert to all users in the queue about a fault state of the machine could in fact ensure more reliable output if any one of the users attends to the problem.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system comprising:
   at least one marking engine;
   a user interface for inputting user determinable delay criteria for a print job;
   a communication link for passing the respective user determinable delay criteria for each print job to a job scheduler;
   wherein the job scheduler determines a print schedule for processing the print job;
   wherein the job scheduler determines the print schedule dependent upon the user determinable delay criteria, a job arrival time, and a system model of capabilities of the at least one marking engine;
   wherein the user determinable delay criteria are selected from the group consisting of a fixed delay time, a number of the user's jobs being held, a job size, a cumulative page count, a job type and a submitting application type;
   wherein the job scheduler delays printing of all jobs for minimizing powering up and powering down cycles of the printing system;
   wherein the job scheduler further comprises:
   determining required printing time for each job, latest starting printing time for each job, and latest finish printing time for each job;
   determining a printing order by the latest starting printing time for each job, and by job arrival time if a conflict exists;
   determining an initial job printing time as the latest time that does not cause a delay in any of the latest finish printing time; and,
   printing all the jobs at said initial job printing time in the determined printing order.

2. The system of claim 1, wherein the user interface is included in a printer driver user interface.

3. The system of claim 1, wherein the user determinable delay criteria are communicated to the job scheduler through the network as a part of a print job description.

4. A printing system comprising:
   at least one marking engine;
   a user interface for inputting user determinable delay criteria for a print job wherein the user determinable delay criteria is selected from the group consisting of actual time plus delay time and latest required print time for printing each job;
   a communication link for passing the respective user determinable delay criteria for each print job to a job scheduler;
   the job scheduler determines a print schedule for processing the print job; and,
   wherein the job scheduler determines the print schedule dependent upon the user determinable delay criteria including required time of printing for each job, latest starting printing time for each job, and latest finish printing time for each job; and,
   wherein the job scheduler sequentially orders each print job into a queue including a plurality of print jobs and finds a place to insert each new arriving print job by searching backward from a latest determinable required print time of all jobs in the queue and stops at a place (Q) job if at least one of the following two conditions is met:
   a) the predetermined delay criteria of the job can be met if it is printed after the (Q) job is printed, or
   b) if the job is printed before the (Q) job, it will cause the (Q) job to miss its associated predetermined delay criteria.

5. The system of claim 4, wherein the job scheduler sequentially orders all print jobs in a sequential order.

6. The system of claim 5, wherein the job scheduler initiates printing start time of all print jobs.

7. The system of claim 5, wherein the job scheduler schedules a print queue for the print jobs according to said sequential order.

8. The system of claim 5, wherein the sequential order includes a print queue scheduled for printing one print job after another.

9. A printing system comprising:
   at least one marking engine;
   a user interface for inputting user determinable delay criteria for each print job in a plurality of print jobs;
   a communication link for passing the respective user determinable delay criteria for each print job to a job scheduler;
   the job scheduler determines a print schedule and a print queue for processing sequentially each print job, wherein the job scheduler determines the print schedule dependent at least upon the user determinable delay criteria and a system model of capabilities of the at least one marking engine;

wherein each new print job is scheduled in a sequential print order; and, wherein when the print queue is empty, said determined schedule includes a latest print time for a first print job comprising a first print job arrival time plus a user determinable delay time for said first print job.

10. The printing system as set forth in claim 9, further comprising:

the job scheduler searches backward from the end of the print queue and stops at a place (Q) job if at least one of the following two conditions is met:

the determined delay criteria of the new job can be met if it is printed after the (Q) job is printed; or, if the new job is printed before the (Q) job, it will cause the (Q) job to miss its associated determined delay criteria.

11. The printing system as set forth in claim 9, wherein said determined schedule includes a latest print time for each print job comprising a print job arrival time plus a print job user determinable delay time, or a print job determinable required print time.

12. The printing system as set forth in claim 11, further comprising:

if print time for a new arriving job (i) minus the current waiting time plus the time required to print the new arriving job is later than the required print time for job (i), then the place in the print queue is (i) and minimum wait time is equal to zero (0).

13. The printing system as set forth in claim 12, further comprising:

inserting the new job after the 0th job, unless the Q=0, then the new job is inserted before the first job.

14. A printing method comprising:

inputting via a user interface user determinable delay criteria for each print job in a plurality of print jobs;

receiving the plurality of print jobs from a print controller and the respective user determinable delay criteria for each print job;

scheduling received print jobs for processing by optimizing a utility function that is dependent upon the user determinable delay criteria, the jobs schedule, and a system model;

processing the print jobs into a sequential print schedule including the user determinable delay criteria of each print job comprising a first print job arrival time plus a first print job user determinable delay time, or a first print job determinable required print time; and, wherein the print schedule sequentially orders each print job into a queue and finds a place to insert each new arriving print job by searching backward from the end of a print queue and stopping at a place (Q) job if at least one of the following two conditions is met:

the predetermined delay time of the at least second print job being met if it is printed after the (Q) job is printed, or if the at least second print job is printed before the (Q) job, it will cause the (Q) job to miss its associated predetermined delay time.

15. The printing method as set forth in claim 14, further comprising:

delaying initiation of processing the print jobs for optimizing the utility function, wherein the utility function includes minimizing powering up and powering down cycles of the printing system.

* * * * *